(12) United States Patent
Rhoton et al.

(10) Patent No.: US 8,393,666 B1
(45) Date of Patent: Mar. 12, 2013

(54) POCKET SECUREMENT SYSTEM FOR TRAILERS AND TRUCKS

(76) Inventors: Roy D. Rhoton, Senoia, GA (US); Larry F. Warren, Newnan, GA (US)

( * ) Notice: Subject to any disclaimer, the term of this patent is extended or adjusted under 35 U.S.C. 154(b) by 0 days.

(21) Appl. No.: 13/547,464

(22) Filed: Jul. 12, 2012

(51) Int. Cl.
*B60P 7/00* (2006.01)

(52) U.S. Cl. .......................................... 296/43

(58) Field of Classification Search .............. 296/43; 410/102, 106, 110, 116, 97, 100; 248/499; 24/265 R, 68 CD, 68 CT
See application file for complete search history.

(56) References Cited

U.S. PATENT DOCUMENTS

| | | | | |
|---|---|---|---|---|
| 1,507,229 | A | * | 9/1924 | Bosley .............................. 296/43 |
| 3,331,334 | A | * | 7/1967 | Broling ............................ 410/102 |
| 3,677,562 | A | * | 7/1972 | Bronstein ........................ 410/97 |
| 3,764,177 | A | * | 10/1973 | Woodward ....................... 296/43 |
| 3,779,174 | A | * | 12/1973 | Doyle et al. .................... 410/121 |
| 4,257,570 | A | * | 3/1981 | Rasmussen .................... 248/503 |
| 6,015,250 | A | | 1/2000 | Walsh et al. |
| 6,626,621 | B1 | | 9/2003 | Hugg |
| 6,939,095 | B1 | | 9/2005 | Hugg |
| 6,945,589 | B2 | * | 9/2005 | Quesenberry ............ 296/100.02 |
| 7,044,700 | B2 | | 5/2006 | Tessier et al. |
| 7,090,449 | B1 | * | 8/2006 | Hugg ............................. 410/102 |
| 7,334,972 | B2 | | 2/2008 | Cash |
| 7,431,548 | B2 | | 10/2008 | Acton et al. |

* cited by examiner

*Primary Examiner* — Lori Lyjak
(74) *Attorney, Agent, or Firm* — J. T. Hollin Attorney at Law, P.C.

(57) ABSTRACT

A trailer or truck bed cargo retaining and pocket protector device for flatbed trailers, industrial trucks, and conestoga-style trucks is disclosed. The device includes a heavy duty steel channel orthogonally welded to a flat iron base plate, the finished unit dimensioned so as to fit within the interior of a trailer stake pocket. A length of ⅜ inch grade 70 steel transport chain is permanently attached to a retaining rod which is welded to the exterior of the base plate. In this manner, cargo loads may be more reliably, efficiently, and safely secured in place on the truck bed by means of connection of additional lengths of chain, strap, steel rope, etc., to opposite-sided stake pockets, wherein each such stake pocket contains a pocket protector device.

4 Claims, 5 Drawing Sheets

# POCKET SECUREMENT SYSTEM FOR TRAILERS AND TRUCKS

CROSS-REFERENCES TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX

Not applicable.

BACKGROUND OF THE INVENTION (1) Field of the Invention

Several types of truck cargo strap or chained securing methods are in use and known in the prior art. However, many of these devices are difficult to use, inefficient, or eventually cause damage to the stake pockets of a truck or trailer bed. These devices also require that the user throw a hook from one side of the truck, over the cargo load before cinching, winding up, or otherwise securing whatever type of cargo retaining means is used on the other side of the truck. The disclosed inventive concept uses a heavy-duty pocket protector and an integral, and in the preferred embodiment, a short length of chain to establish a secure, safe anchoring point at a plurality of stake pocket locations on the truck or trailer bed.

(2) Description of the Related Art, Including Information Disclosed Under 37 CFR 1.97 and 1.98.

U.S. Pat. No. 8,192,119 B1 (Jun. 5, 2012; Small, S.) A trailer cargo strap rolling device for conestoga-style and flatbed trailers including a base that fits into a trailer stake pocket, an adjustable post member secured into a selected height with a lock pin, and a winder assembly operated either manually or with a wireless drill with two prongs around which a trailer strap can be wound.

U.S. Pat. No. 7,431,548 B2 (Oct. 7, 2008; Acton et al.) discloses a housing assembly for housing a restraint device is provided. The housing assembly may be recessed into a floor or a wall of a building or a vehicle. The restraint device may be a retractor. The separate mounting plate may be moveably mounted to the storage chamber. The restraint device may be mounted to the storage cover. The restraint device may be mounted to the mounting plate. The housing assembly may be mounted in a recess in a support structure such as a wall or a floor. The wall or floor may be a support structure of for example and without limitation a building, a vehicle, a trailer and the like.

U.S. Pat. No. 7,334,972 B2 (Feb. 26, 2008; Cash M.) A retractable tie down for tying a work vehicle down to a cargo vehicle is disclosed, the tie down including a retractor assembly fixed to the outer surface of a work vehicle; a belt with one end connected to the retractor assembly; and a coupling connected to the other end of the belt, wherein the belt has a length sufficient to reach the cargo vehicle.

U.S. Pat. No. 7,044,700 B2 (May 16, 2006; Tessier et al) presents a strapping system which includes a pair of rollers supported by a frame above the deck which extend in a longitudinal direction of the deck. Strapping is rolled onto the rollers. Anchors at the free ends of the strapping can be secured along opposing sides of the deck. A tightener in the form of a crank and ratchet mechanism is coupled to the rollers for tensioning the strapping spanning between the rollers and the free ends anchored to the sides of the deck. The load is retained beneath the strapping under tension. The tightener permits common tensioning of all strapping of each roller in a single, time saving operation to ensure loads readily secured before transport.

U.S. Pat. No. 6,939,095 B1 (Sep. 6, 2005; Hugg, R.) The invention is a tie-down strap or chain anchor is described for use with a trailer or truck. The anchor includes a stem portion which is adapted to be secured to one side of the bed of the trailer or truck. A pair of spaced-apart plates are secured to the upper end of the stem portion and have a U-shaped receiver secured thereto and extending therebetween which includes an inclined portion and a generally U-shaped portion at the lower end thereof. The U-shaped portion has a slot or notch formed therein.

U.S. Pat. No. 6,626,621 B1 (Sep. 30, 2003; Hugg, R.) discloses a generally Y-shaped winch assembly is described for use with a trailer or truck. The winch assembly includes a stem portion having a pair of horizontally spaced-apart plates extending upwardly from the upper end thereof. A strap receiver mechanism is rotatably mounted on the plates and is controlled by a conventional winch ratchet assembly.

U.S. Pat. No. 6,015,250 (Jan. 18, 2000; Walsh et al.) discloses an invention in which a platform trailer includes a load carrying main frame and an elongated loading deck supported by the main frame and defining a generally planar surface upon which cargo may be loaded. An elongated side rail is attached to at least one of the loading deck and the main frame so that the side rail is disposed along a longitudinal edge of the trailer. The side rail defines an upwardly opening channel extending along the longitudinal edge. The channel has a planar central portion substantially parallel to a plane defined by an upper horizontal surface of the loading deck and opposing side portions extending vertically upward from the central portion.

BRIEF SUMMARY OF THE INVENTION

The inventive concept is a cargo retaining and pocket protector device for use by inserting into the stake pockets of flatbed trailers, industrial trucks, and conestoga-style trucks so equipped. The device includes a heavy duty steel channel orthogonally welded to a flat iron base plate, the finished unit dimensioned so as to fit within the interior of a stake pocket. A length of ⅜ inch grade 70 steel transport chain is permanently attached to a retaining rod which is welded to the exterior of the base plate.

During the cargo loading process the driver or cargo loader inserts a desired number of the pocket protectors in the appropriate stake pockets. To accomplish this at each desired stake pocket location, a securing pin is utilized to temporarily hold the pocket protector chain in a vertical position within the channel walls. This temporary arrangement allows the gathering and positioning of longer, more extensive cargo binding chains, steel rope, straps or other binding material across and/or atop the cargo load. In this manner, cargo loads may be more reliably, efficiently, and safely secured in place on the truck bed by means of connection of additional lengths of chain, strap, steel rope, etc., to the top link of the pocket protector chain, as positioned in opposite-sided stake pockets each containing a pocket protector device.

DETAILED DESCRIPTION OF THE INVENTION

Figure 1:
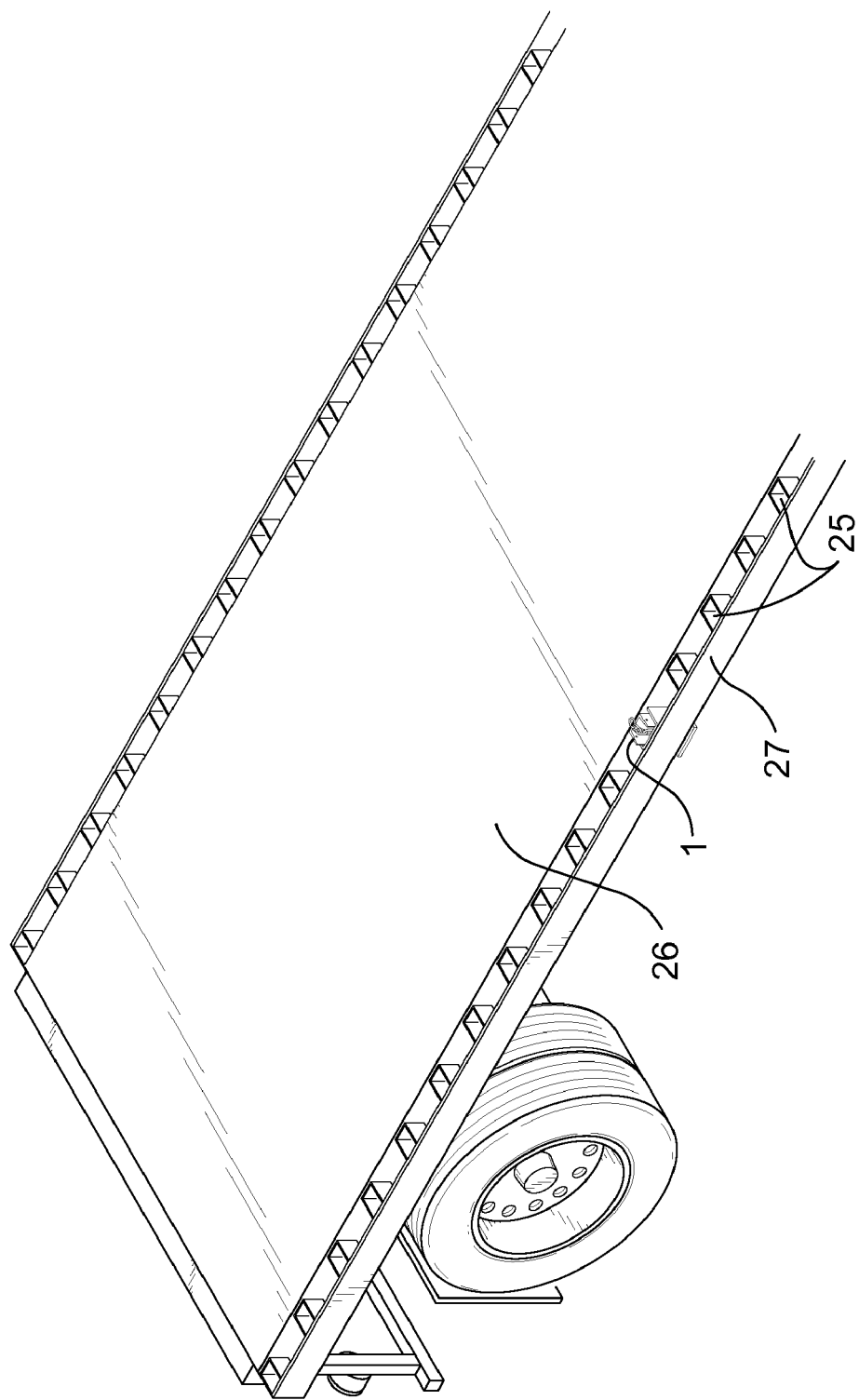
FIG. 1 is an overall view of a trailer bed, showing the pocket protector inserted within one of the stake pockets constructed on the side of the trailer.
Figure 2:
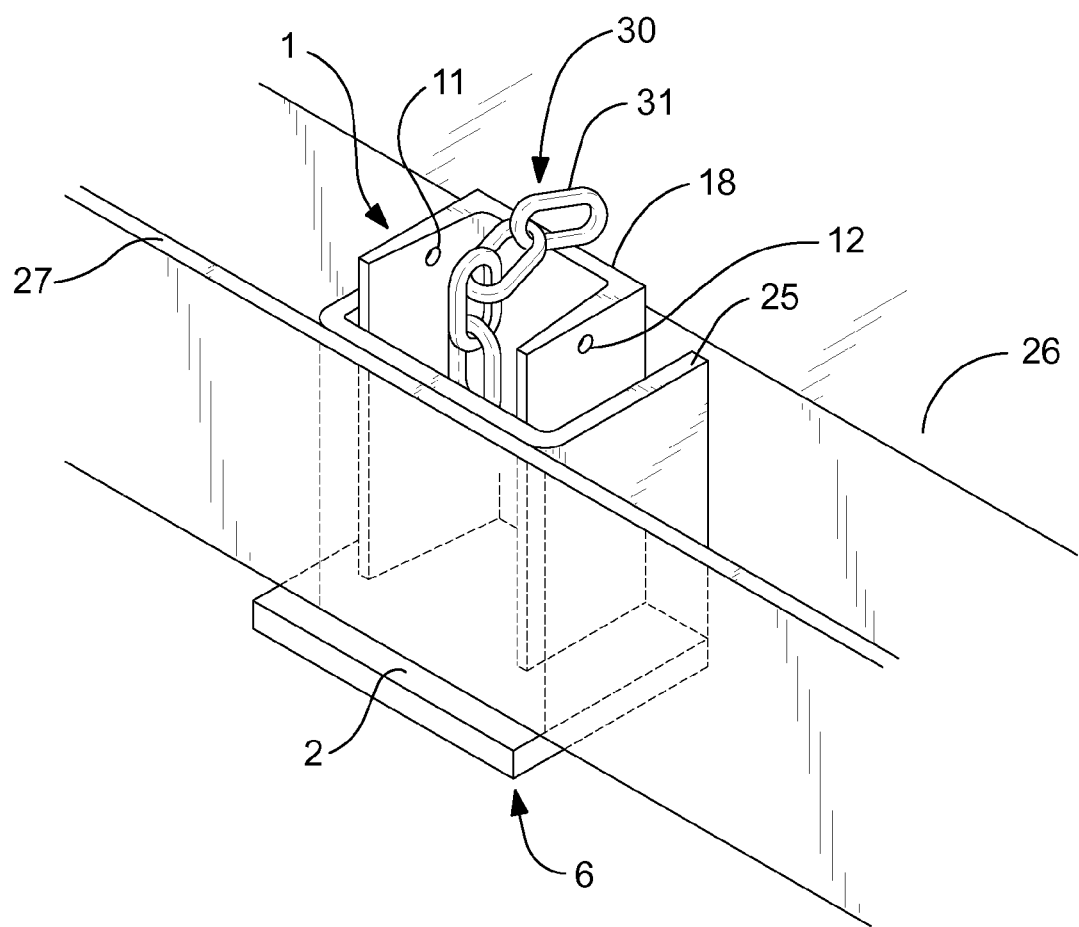
FIG. 2 depicts a close-up view of the pocket protector inserted within a stake pocket.

Beginning with FIG. 1, there is shown a distant view of a truck trailer bed 26 with the pocket protector 1 inserted within a stake pocket 25 of the trailer bed 26. FIG. 2 illustrates a close-up view of the relative positioning of the pocket protector 1 inserted into the stake pocket 25. FIG. 2 further demonstrates that the outer perimetral dimensions and profile of the pocket protector 1 correspond substantially with the inner dimensions and profile of the stake pocket 25, thus providing a close, unwavering fit. Also shown in FIG. 2 is a length of chain 30 which is permanently attached to the bottom portion of the pocket protector 1, as will be shown in more detail later.

As is typically constructed, the stake pocket 25 shown in FIG. 2 is affixed between the outer edge of the truck bed 26 and the side rail 27. In order to operationally use the pocket protector, a user must direct the length of the pocket protector 1 upwards through the lower opening of the stake pocket 25, then grasp and pull the chain 30 upwards so as to bring the base topside 2 in direct contact with the bottom edge of the side rail 27. The topside 2 of the device base plate 6, which is an integral part of the pocket protector 1, simultaneously abuts the bottom edge of the side rail 27 and the bottom of the stake pocket 25. The base plate 6 preferably comprises ⅜ inch flat iron.

The top link 31 of the chain 30 is utilized as a connecting means for attaching additional lengths of cargo load binding equipment, which may include a chain, a strap, steel rope, etc. to the pocket protector 1. A left hole 11 and a right hole 12 have concentric axes which are used for the insertion of a securing pin 41 through both holes 11, 12 and an adjacent chain 30 link to serve as a temporary, hands-free support means for the pocket device 1 within the stake pocket 25.

Figure 3:
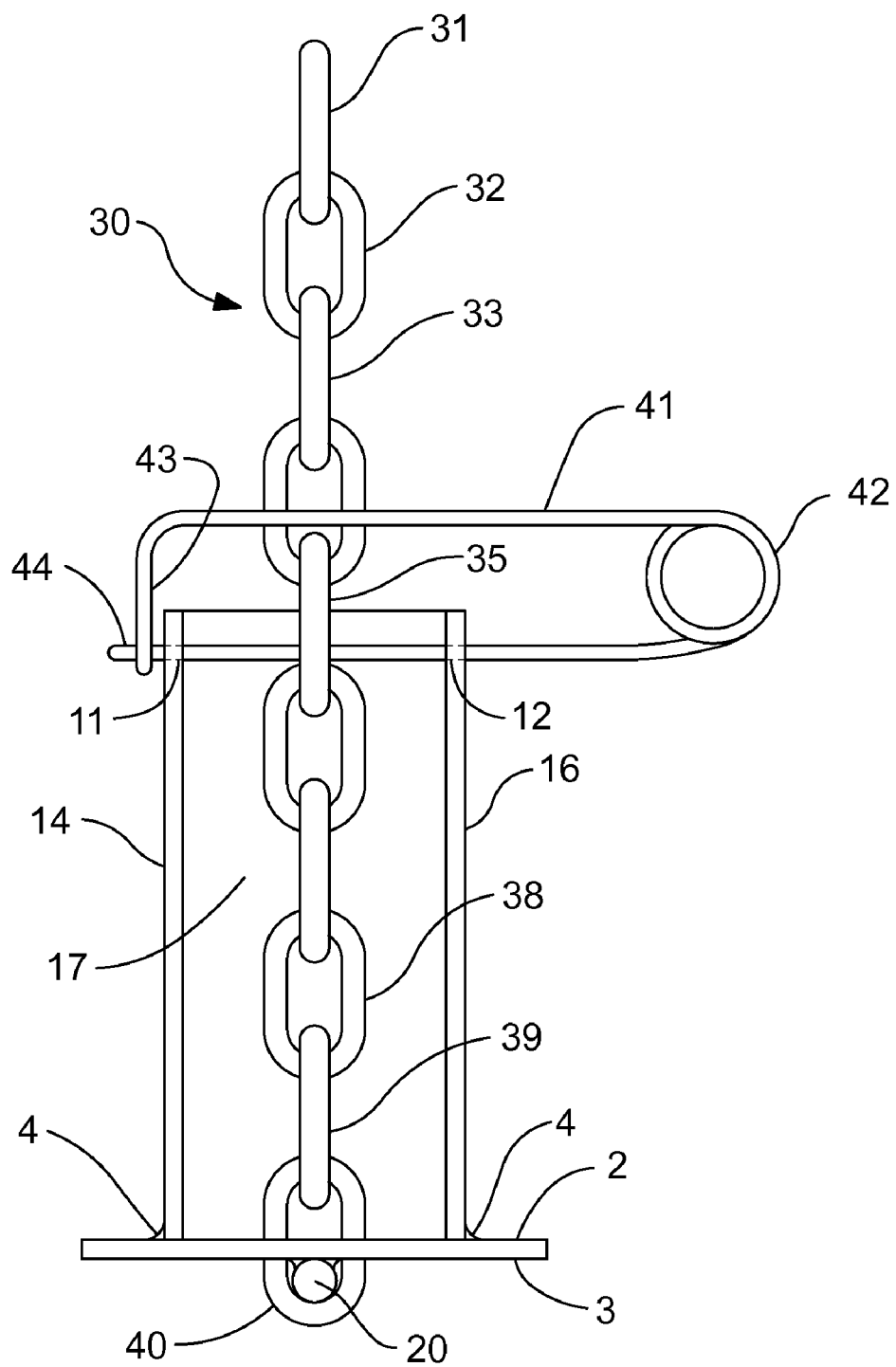
FIG. 3 is a head-on front view of the pocket protector with its integral chain, the chain being held in place by means of a securing pin.
Figure 5:
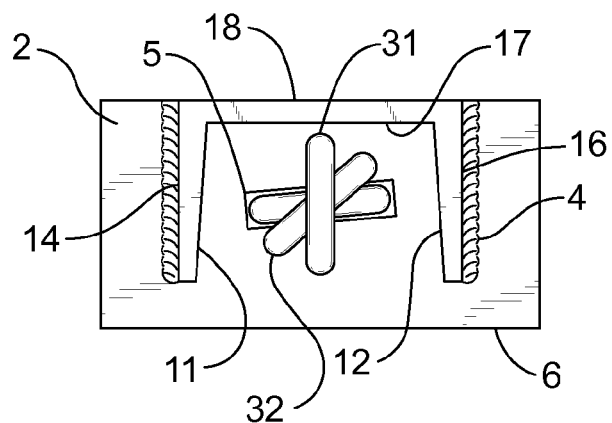
FIG. 5 is a top view of the pocket protector illustrating the profile of the steel channel, the top link, link two of the chain, and the extended edges of the base plate.

FIG. 3 displays a front view of a stand-alone pocket protector 1 fully configured. In viewing FIG. 5, the top-downward-looking view of the pocket protector 1 shown in FIG. 3, it is seen the cross-sectional shape of the pocket protector 1 is shown. This specific shape is derived from use of 3-inch channel iron, or other suitable material having a channel shape. Again referring to FIG. 5, the inner channel left wall 13, outer channel wall 14, inner channel right wall 15, outer channel right wall 16, inner channel back 17, and outer channel back 18, are shown. The channel iron component walls (11-18) are welded 4 to the base topside 2, as illustrated in FIG. 3 and FIG. 5.

FIG. 3 depicts the positioning of a pocket protector 1 just prior to further connection of the top link 31 to additional lengths of cargo load securing means. In the preferred embodiment, the chain 30 of the pocket protector 1 comprises ten links of ⅜ inch grade 70 steel transport chain. The bottom link 40 provides an anchoring attachment of the entire chain 30 by virtue of the interior loop of the bottom link 40 being placed around the circumference of a length of one-half inch steel retaining rod 20, said retaining rod 20 being welded to the underside 3 of the base plate 6.

Figure 7:
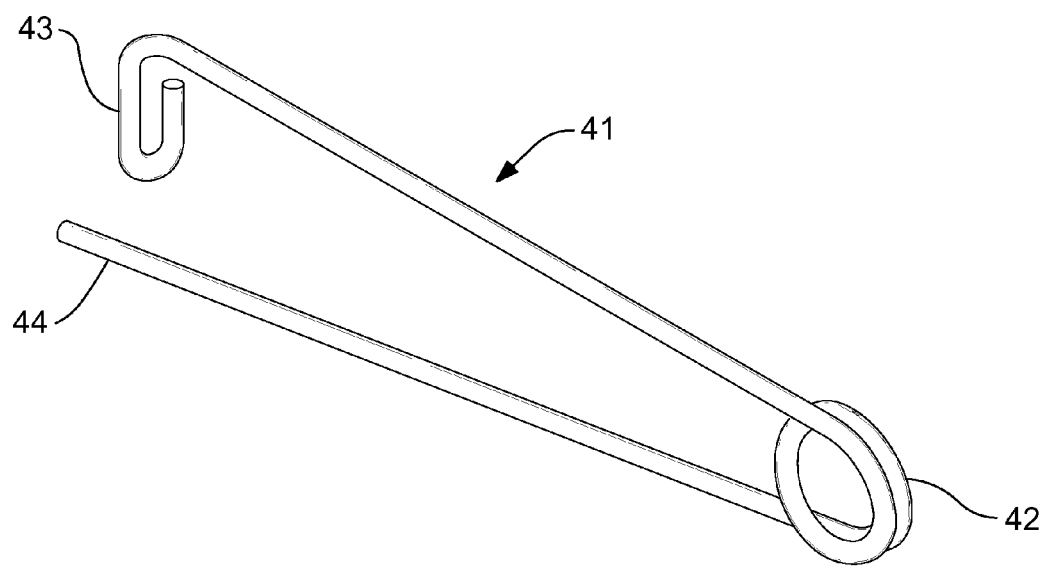
FIG. 7 illustrates the securing pin in its open configuration.

FIG. 3 also illustrates a securing pin 41 inserted through components of the pocket protector 1. The securing pin 41 is depicted in detail in FIG. 7. The securing pin 41, in an "open" configuration, is inserted, by means of its insertion end 44 being placed, in sequence, through the right hole 12, an adjacent chain link 35, and the left hole 11 of the pocket protector 1. Thereupon, the insertion end 44 is depressed toward the main body of the securing pin 41, which compresses the pin coil 42 so as to allow placement of the pin insertion end 44 within the pin retainer hook 43. The preceding description is the method used to temporarily prepare a pocket protector 1 for use at each desired stake pocket 25 on a truck or trailer bed.

Figure 4:
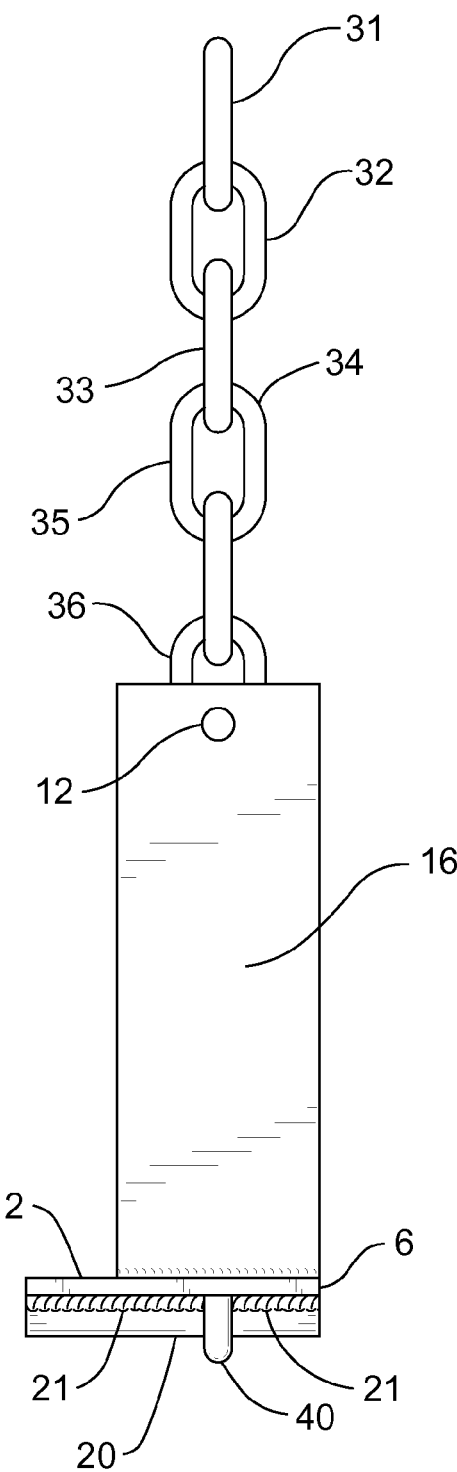
FIG. 4 is a side view of the pocket protector with the integral chain extended upwards.
Figure 6:
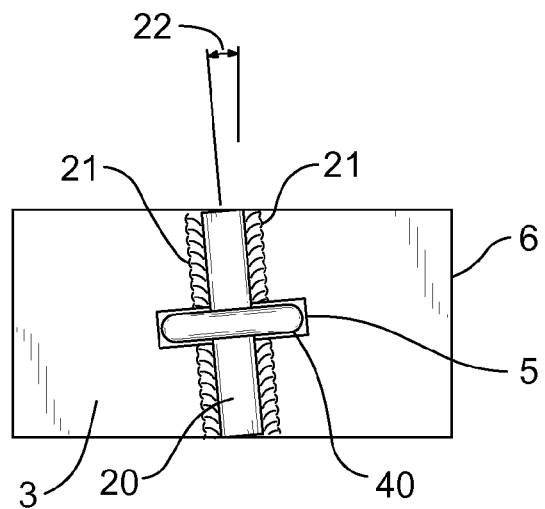
FIG. 6 presents a bottom view of the pocket protector, further showing the bottom link of the chain encompassing a retaining rod.

Turning to FIG. 6, there is shown a view of the bottom of the pocket protector 1, specifically the underside 3 of the base plate 6. It is noted that the bottom link 40 of the chain 30 is shown encompassing the midpoint of the retaining rod 20. A different perspective of this arrangement is also presented in FIG. 4, wherein the entire length of the retaining rod 20 is shown welded 21 to the underside of the base plate 6 and the bottom link 40 again is shown positioned about the retaining rod 20.

Referring again to FIG. 6, it is observed that there is a rectangular base opening 5, of sufficient dimensions to allow the through-passage of the bottom link 40. The base opening 5 is oriented at an approximately twenty degree angle 22 in order to allow room for the cross-sectional thickness of the chain 30 links to fit within the confines of the pocket protector 1, which itself is limited by the interior dimensions of the stake pocket 25. During fabrication of the pocket protector 1, the retaining rod 20 is thus welded 21 to the underside of the base plate 6. The weld 21, is also performed perpendicular to the base opening 5 to further ensure that the chain 30 is oriented longitudinally with some degree of freedom of movement within the walls 13, 15, 17 of the steel channel.

While preferred embodiments of the present inventive concept have been shown and disclosed herein, it will be obvious to those persons skilled in the art that such embodiments are presented by way of example only, and not as a limitation to the scope of the inventive concept. Variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

What is claimed is:

1. A stake pocket insertable device for providing secure anchored connection of a load restraining means to a stake pocket of the type commonly installed on trailer beds or conestoga-style truck trailers, comprising:

a length of steel channel having a back wall, a left wall, a right wall, a first end, and a second end;

a binding member, being a length of material approximately twice the length of said steel channel and having an initial end and a terminal end;

an essentially rectangular, planar metal base plate, having an upper surface and an undersurface, and further having an opening of dimensions greater than the cross-sectional dimensions of said binding member, said opening through-cut at the geometric center of said base plate wherein the second end of said steel channel is centeredly and perpendicularly attached to the upper surface of said metal base plate, thereby encompassing said opening equidistant between said left wall and right wall;

a means for attaching the initial end of said binding member to the undersurface of said base plate subsequent to insertion of said binding member downward through said opening;

a means for temporarily attaching the terminal end of said binding member proximate the first end of said steel channel.

2. A pocket chain device for providing secure anchored connection of a load restraining means to a stake pocket of the type commonly installed on trailer beds or conestoga-style truck trailers, comprising:

a length of steel channel having a back wall, a left wall, a right wall, a first end, and a second end, further comprising a hole of at least 3/16 inch diameter horizontally drilled through each of said walls proximate the first end of said steel channel, said holes being co-axial;

a binding member comprising a length of grade 70 steel chain comprising at least ten (10) links beginning with a first link and terminating with a last link;

an essentially rectangular, planar metal base plate, having an upper surface and an undersurface, and further having a rectangular opening comprising width and length dimensions greater than the cross-sectional dimensions of said last link of said steel chain, said opening through-cut at the geometric center of said base plate;

a ½ inch diameter retaining rod of a length no longer than the smaller dimension of said base plate;

a securing pin, constructed from wire of no greater than ⅛ inch diameter, having a spring-loaded coil portion, a hook portion, and an insertion portion, wherein the second end of said steel channel is welded, centeredly and perpendicularly, to the upper surface of said base plate, thereby encompassing said rectangular opening equidistant between said left wall and right wall; whereupon said retaining rod is (a) positioned within the inner perimeter of said last link, and welded onto the undersurface of said base plate, at an angle of approximately twenty (20) degrees relative to the edge of said metal base plate, thereby enabling said chain to be pulled lengthwise upwardly within said steel channel;

whereby said securing pin may be inserted cross-wise through the hole in the right wall of said channel, through an adjacent link of said chain, and through the hole in the left wall of said channel, and said securing pin is fastened upon itself by means of spring-loaded action of said coil and said hook portion.

3. A pocket chain device as set forth in claim 2 wherein said steel channel comprises dimensions of a back wall approximately three inches in lateral external width, a left wall having external dimensions of 6.0 inches by 1.5 inches, and a right wall having external dimensions of 6.0 inches by 1.5 inches.

4. A method for facilitating the reliability, strength, and efficiency of the fastening means utilized at the locations of a plurality of stake pockets of the type commonly installed on trailer beds or conestoga-style truck trailers, to secure the restraining means of cargo carried, said method comprising the steps of:

providing a length of steel channel having external dimensions comprising a back wall approximately three inches in lateral width, a left wall having dimensions of 6.0 inches by 1.5 inches, a right wall having dimensions of 6.0 inches by 1.5 inches, a top end, and a bottom end, further comprising a hole of at least 3/16 inch diameter drilled through each of said walls proximate the top end of said steel channel, said holes being co-axial;

providing a length of grade 70 steel transport chain comprising at least ten (10) links beginning with a top link and terminating with a bottom link;

providing an essentially rectangular, planar metal base plate, having an upper surface and an undersurface, and further having a rectangular opening comprising dimensions greater than the cross-sectional dimensions of a link of said chain, said opening through-cut at the geometric center of said base plate, said opening of dimensions sufficient to allow insertion of a link of said chain;

providing a ½ inch diameter retaining rod of a length no longer than the smaller dimension of said base plate; and providing a securing pin, constructed from wire of no greater than ⅛ inch diameter, having a spring-loaded coil portion, a hook portion, and an insertion portion;

welding the bottom end of said steel channel symmetrically and perpendicularly to the upper surface of said base plate, thereby encompassing said rectangular opening equidistant between said left wall and right wall;

inserting the bottom link of said steel chain into said opening, starting at the upper surface of said base plate;

positioning said retaining rod within the inner perimeter of said bottom link;

positioning said retaining rod firmly against the undersurface of said base plate at an angle of approximately twenty degrees (20°) crosswise to the midpoint of said opening;

welding said retaining rod onto the undersurface of said base plate; and thereafter, (a) inserting said pocket chain device upwards through the bottom of the first of said stake pockets; (b) pulling the top link of said chain upwards lengthwise within said steel channel; (c) placing said securing pin cross-wise through the hole in the right wall of said channel, through the nearest located link of said chain, and through the hole in the left wall of said channel; and (d) fastening said securing pin upon itself by means of spring-loaded action of said coil and said hook portion; (e) fastening the remaining required cross-bed chain or other load restraining means to the exposed top link of said chain; and (f) continuing the above described sequential steps (a) through (e) at the location of each remaining desired pair of cross-bed opposed stake pockets.

* * * * *